United States Patent [19]

Peters

[11] 3,742,277

[45]*June 26, 1973

[54] FLYING SPOT SCANNER HAVING SCREEN OF STRONTIUM THIOGALLTE COACTIVATED BY TRIVALENT CERIUM AND DIVALENT LEAD

[75] Inventor: Thomas E. Peters, Chelmsford, Mass.

[73] Assignee: GTE Laboratories Incorporated, Waltham, Mass.

[ * ] Notice: The portion of the term of this patent subsequent to Nov. 30, 1988, has been disclaimed.

[22] Filed: Mar. 18, 1971

[21] Appl. No.: 125,611

Related U.S. Application Data

[63] Continuation-in-part of Ser. No. 838,170, July 1, 1969, abandoned.

[52] U.S. Cl. ........................ 313/92 PH, 252/301.4 S

[51] Int. Cl. ...... H01j 29/20, H01j 31/12, C09k 1/12

[58] Field of Search ................................ 313/92 PH; 252/301.4 S, 301.6 S

[56] References Cited

UNITED STATES PATENTS

| | | | |
|---|---|---|---|
| 3,623,996 | 11/1971 | Amster | 252/301.4 S |
| 3,639,254 | 2/1972 | Peters | 252/301.4 S |

FOREIGN PATENTS OR APPLICATIONS

| | | | |
|---|---|---|---|
| 250,139 | 3/1964 | Australia | 313/92 PH |

*Primary Examiner*—Robert Segal
*Attorney*—Irving M. Kriegsman

[57] ABSTRACT

A flying-spot scanner tube for use in a color flying-spot scanner system. The tube has a phosphor screen wherein at least one of the phosphors included therein comprises a cerium and/or lead activated alkaline earth thiogallate phosphor.

1 Claim, 3 Drawing Figures

INVENTOR.
THOMAS E. PETERS
BY R. J. Frank
ATTORNEY.

PATENTED JUN 26 1973 3,742,277

SHEET 2 OF 3

INVENTOR.
THOMAS E. PETERS

BY R. J. Frank
ATTORNEY.

INVENTOR.
THOMAS PETERS

ATTORNEY

FLYING SPOT SCANNER HAVING SCREEN OF STRONTIUM THIOGALLTE COACTIVATED BY TRIVALENT CERIUM AND DIVALENT LEAD

This application is a continuation-in-part of Ser. No. 838,170 filed July 1, 1969, now abandoned.

BACKGROUND OF THE INVENTION

This invention relates to cathodoluminescent screens and, in particular, to improvements in flying-spot scanner tubes.

Flying-spot scanning systems have found general use in television transmission, and especially in the transmission of transparencies or films. In a flying-spot scanning system a high intensity scanning light spot is focused on a transparency or film by a lens system. The transmission of light through the film is modulated by the film density point by point and the modulated light beam is received by a photomultiplier tube. The output of the photomultiplier tube is a video signal which represents the film transparency as a function of the scanning spot position.

The source of the scanning light spot in a flying-spot scanning system is a raster-forming kinescope commonly known as a flying-spot scanner tube. This tube is a cathode ray tube in which the scanning pattern is traced by an unmodulated beam on a short-persistence phosphor screen. A short-persistence phosphor is required since the light reaching the photomultiplier tube at any given instant should ideally be only that transmitted by a picture element of the transparency or film. If the screen phosphor has significant persistence this condition will not be met since the photomultiplier will receive light from elemental areas of the film which had been previously scanned, thereby producing an unwanted signal.

Conventional black-and-white flying-spot scanning systems employ tubes which contain one of a variety of short-persistence phosphors such as zinc oxide. In monochrome systems the phosphor can be chosen for its short-persistence and brightness properties without great regard for its spectral emission characteristics. As long as the photomultiplier tube is sufficiently responsive to the phosphor's output, any suitable output wavelengths in the visible or near ultraviolet regions can be used. This is not the case, however, in a color flying-spot scanning system.

In a color system, after passage of the light through the film the modulated light beam is separated into color components, typically by passing it through dichroic mirrors. The most commonly used components are the red, blue, and green components of a conventional tricolor system. The color components are sensed by three photomultiplier tubes, each of which is chosen to be especially sensitive to the particular color component which it is sensing. The photomultiplier outputs are thus three video signals, one for each color component of the transmitted light. In a system of this type, accurate color reproduction makes it desirable for the scanning light spot to have a spectral energy distribution which extends over most of the visible region of the spectrum. In other words, an accurate measure of the color transparency of each elemental area of the film can be obtained if all possible colors are contained in the scanning light beam's spectral energy distribution.

It is current practice to achieve a broad white field by blending two phosphors, one of which has a relatively broad emission spectrum in the blue and the other in the yellow region of the spectrum. A present version of a flying-spot scanner tube for use in a color system employs cerium-activated yttrium aluminum garnet ($Y_3Al_5O_{12}$:Ce or "YAG"), a yellow-emitting phosphor, in combination with cerium-activated calcium aluminum silicate ($Ca_2Al_2SiO_7$:Ce or "CAS"), a blue-emitting phosphor. These phosphors both have the desirable characteristic of short persistence. The YAG has a broadband cathodoluminescent emission which peaks at about 520 nanometers in the yellow region of the spectrum. However, only a relatively small portion of this emission extends into the red spectral region. The CAS is a cathodoluminescent phosphor having its emission peak at about 400 nanometers with a substantial part of its emission lying in the ultraviolet region of the spectrum. A blend consisting of about 25 percent CAS and about 75 percent YAG (by weight) is commonly used. The emission spectrum of this blend approximates the emission spectra of its two constitutent phosphors placed side-by-side since there is but little overlap of their respective spectra. In fact, the emission spectrum of this YAG-CAS blend has peaks which correspond approximately to the individual phosphor peaks, and a valley between these peaks having a minimum at about 470 nanometers.

There are certain inherent disadvantages, however, in a flying-spot scanner tube which employs a screen composed of a mixture of CAS and YAG. The spectral energy distribution of this mixture, as stated, has a peak which extends into the ultraviolet and a distinct valley in the blue region of its spectrum. There is also a strong peak in the yellow region of its spectrum but there is little emission in the red spectral (> 600 nm) region. A color system employing such a tube is limited in its blue and red reproduction capability by the presence of the valley in the blue spectral region and the deficiency of significant emission in the red spectral region. The degree of such limitation will, of course, depend upon the spectral response of a particular system's blue and red sensitive channels, including the characteristics of its filters, dichroic mirrors, and photodetectors. In any case, it is clearly undesirable from an efficiency standpoint for the tube to have a significant portion of its emission lie in the ultraviolet region of the spectrum, since it is the subject film's transparency to visible light which is of of interest. In addition, absorption of ultraviolet emission by the tube face-plate is immediately wasteful of such emission.

The deficiency in the red spectral region is also troublesome since most phototubes are relatively insensitive to red light. Consequently, the photocurrent generated by the red detector must be amplified to a much greater extent than that of the corresponding green and blue detectors. This results in an unfavorable signal-to-noise ratio and causes loss of definition in the displayed picture.

The CAS-YAG tube suffers from an additional problem which is inherent in most cathode ray tubes that employ mixed phosphor screens. Differences in the physical properties of the two phosphors such as density, particle size and morphology, make it difficult to obtain a completely homogeneous mixture and consequently the spectral distribution of the scanning light spot varies slightly from point to point on the tubes screen. This contributes to screen noise which is defined as the elemental variation in radiant emission as the screen is scanned by an unmodulated electron beam. Screen noise is an important factor in the performance of flying spot scanner systems since it becomes a part of the generated video signal which must pass through several stages of amplification in the process of producing a television picture. Thus, the noise generated by the scanner tubes screen reduces the signal-to-noise ratio of the displayed picture.

A further disadvantage of a tube employing a CAS-YAG mixture results from the severe degradation in brightness of the CAS phosphor during the initial hours of tube operation. This characteristic necessitates that the tube be operated for several hours, or "burned in" before its incorporation in a flying-spot scanner system so that frequent readjustments and balancing of system circuit parameters are not required to compensate for the brightness degradation of the blue phosphor. This "burn-in" is a time consuming and wasteful production step in the manufacture of flying-spot scanner systems.

Accordingly, I have invented flying-spot scanner tubes having improved spectral characteristics and performance stability. In addition, I have invented a tube of this type having improved spectral characteristics, performance stability and reduced screen noise.

SUMMARY OF THE INVENTION

The present invention is directed toward flying-spot scanner tubes and to phosphor screens for use in such tubes wherein at least one of the phosphors included in the screen comprises an activated alkaline earth thiogallate phosphor having the general formula $RGa_2S_4{:}A$, where R is an alkaline earth selected from one or more elements of the group consisting of strontium, calcium and barium and A is an activator selected from one or more elements of the group consisting of cerium and lead.

In one embodiment of the invention, the scanner tube phosphor screen comprises a mixture of blue-emitting cerium-activated strontium thiogallate mixed with a yellow-emitting phosphor, such as cerium-activated aluminum garnet (YAG). This tube has been found to suffer substantially less brightness degradation during initial usage than one which contains a standard CAS-YAG mixture. In addition, the tube's output radiation is advantageously located in the visible spectrum with little significant output in the ultraviolet.

In another embodiment of the invention, the scanner tube screen comprises a mixture of a red-emitting phosphor, lead-activated strontium thiogallate, and blue-emitting cerium-activated strontium thiogallate. This tube exhibits better spectral characteristics than tubes containing the CAS-YAG mixture and, in addition, the output radiation in the blue and red spectral region is substantially increased.

In still another embodiment, the scanner tube phosphor comprises a white-emitting strontium thiogallate activated by both cerium and lead. This tube exhibits better spectral characteristics, and lower screen noise than tubes containing the CAS-YAG mixture.

DESCRIPTION OF THE PREFERRED EMBODIMENTS

Figure 1:
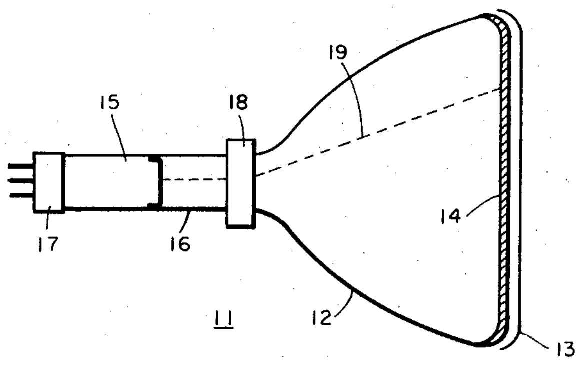
FIG. 1 is a sectional view of a flying-spot scanner tube.

Referring to FIG. 1, there is shown a flying-spot scanner tube 11 comprising an evacuated envelope 12 having a glass face-plate 13 at one end. A phosphor screen 14 is affixed to the internal surface of the faceplate 13. An electron gun 15 is mounted in the neck 16 of the tube 11 which is sealed by a tube socket 17 having pins for connection to energizing circuitry. Deflection means 18, for example a magnetic deflection yoke, is mounted on the neck 16 and used to scan the electron beam 19 produced by gun 15 across the phosphor screen 14 in a predetermined scan pattern. The phosphor screen may comprise a mixture of short-persistence yellow-emitting and blue-emitting phosphors mixed in such proportion as to emit white light when excited by electron radiation. Alternately, the screen may comprise a white-emitting short-persistence cathodoluminencent phosphor, or a mixture of short-persistence red-emitting and blue-emitting phosphors whose output combine to emit white light.

In one embodiment of the invention a yellow-emitting phosphor, such as cerium-activated yttrium aluminum garnet is mixed with a blue-emitting phosphor comprising strontium thiogallate activated by cerium. The cerium-activated strontium thiogallate phosphor may include a charge compensating element such as sodium, potassium or zinc. A preferred phosphor composition for the tube of the present invention is sodium-compensated and can be represented by the formula $Sr_{1-2w}Na_wGa_2S_4{:}Ce_w$ where $w$ has the approximate range 0.01 to 0.12 gram-atom per mole. The methods of preparation of the cerium-activated strontium thiogallate phosphors utilized in the present invention are disclosed in my copending application Ser. No. 838,065 filed July 1, 1969 and assigned to the same assignee as the present application.

Figure 2:
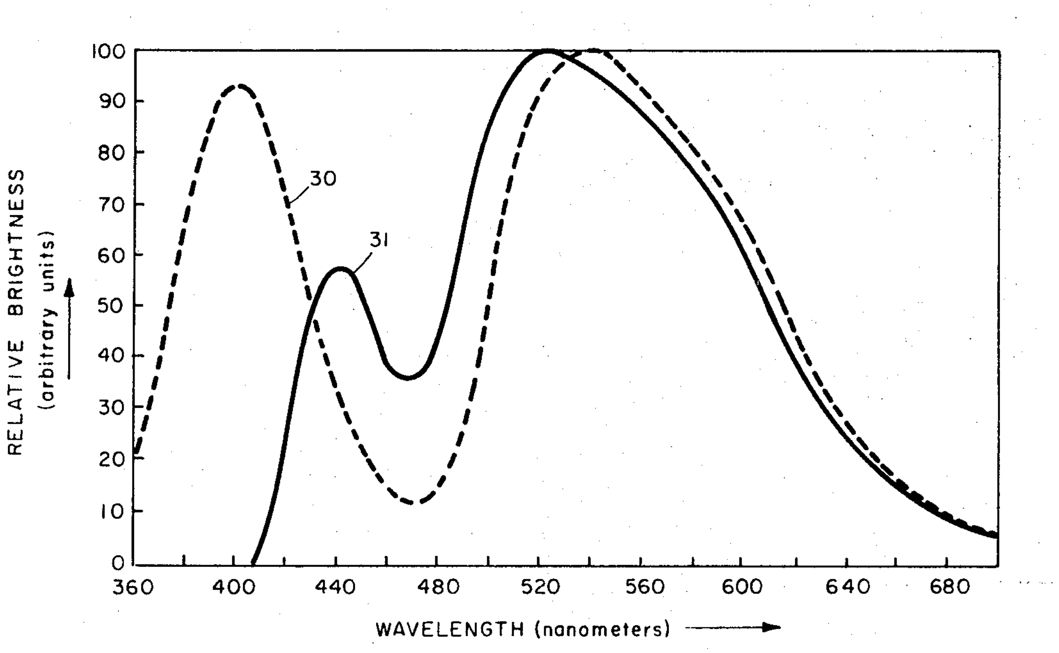
FIG. 2 is a graphical representation of the spectral emission characteristics of a prior art flying-spot scanner tube and of tubes in accordance with the invention.

A flying-spot scanner tube phosphor screen 14 was made by settling a mixture of YAG activated by 2 mole percent cerium and sodium compensated strontium thiogallate activated by 4 mole percent cerium onto tube faceplate 13. The mixture consisted of about 75 percent by weight of YAG phosphor to about 25 percent by weight of the thiogallate phosphor. A 5 inch diameter flying-spot scanner tube having this screen was compared with a commercially available 5 inch diameter tube having a screen consisting of a mixture of about 75 percent YAG and 25 percent CAS (by weight). FIG. 2 shows the spectral emission characteristics of the two tubes with dashed curve 30 corresponding to the CAS-containing tube and curve 31 corresponding to the thiogallate-containing tube. It is seen that the CAS-containing tube emission has a distinct minimum at about 470 nanometers where the relative brightness is only about 12 percent of the maximum which occurs at the yellow peak at about 535 nanometers. The blue-component emission of this tube is seen to peak at about 400 nanometers and extends well into the ultraviolet region of the spectrum.

The thiogallate-containing tube emission also has a minimum near 470 nanometers but the relative brightness at this minimum is considerably higher than the CAS-containing tube, being about 36 percent of maximum. Also, it is seen that the blue-component emission of this tube peaks at about 440 nanometers and does not extend appreciably into the ultraviolet.

Figure 3:
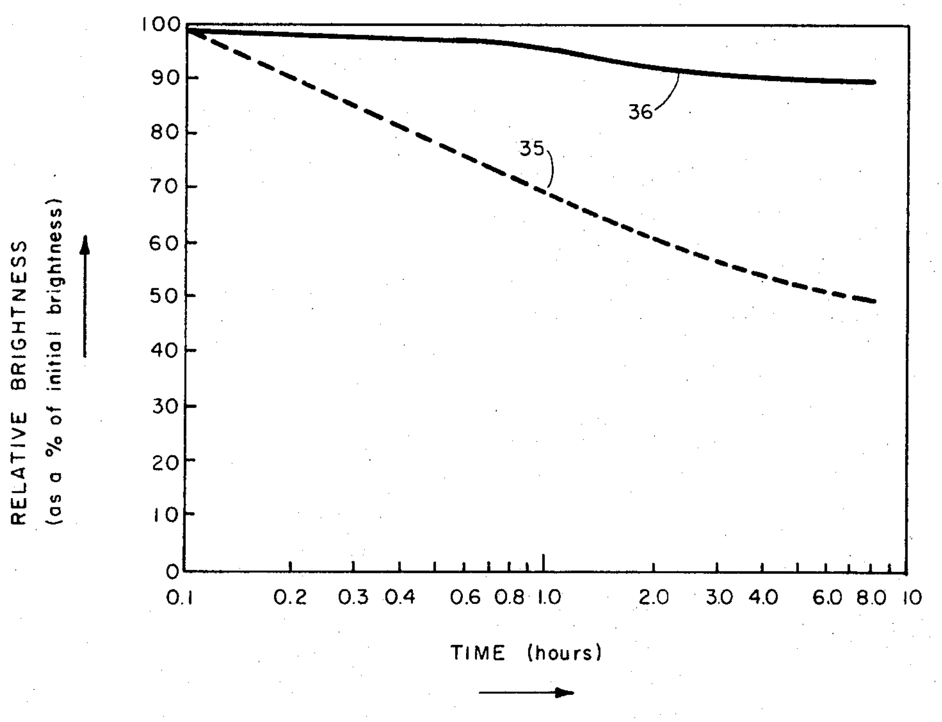
FIG. 3 is a graph depicting the brightness degradation as a function of operating time for a prior art tube and for a tube in accordance with the invention.

The degree of degradation of the disclosed thiogallate-containing tube was measured by comparing a five inch diameter tube having a screen comprising the strontium thiogallate phosphor of the preceding example with one having a screen formed of the CAS phosphor of that example. Each tube was operated at a beam current of 100 microamperes over a 2¼ × 3 inch raster. FIG. 3 shows the percent of initial brightness of each tube as a function of operating time (depicted on a logarithmic scale). The output of the CAS-containing tube (curve 35) is seen to have decreased in brightness to a level of about 50 percent of its original brightness after 8 hours of operation, whereas the thiogallate-containing tube (curve 36) exhibited almost 90 percent of its original brightness after 8 hours.

In another embodiment, a screen employing a white-emitting phosphor was prepared comprising strontium thiogallate activated by both cerium and lead. The cerium and lead-activated strontium thiogallate phosphor may include a charge compensating element such as sodium. A preferred phosphor composition for the tube of the present invention is sodium-compensated and can be represented by the formula $Sr_{1-(2w+z)}Na_wGa_2S_4:Ce_wPb_z$ where $w$ and $z$ have the approximate range 0.001 to 0.12 gram-atom per mole.

In still another embodiment a red-emitting phosphor comprising strontium thiogallate activated by lead was mixed with blue-emitting cerium activated strontium thiogallate. A preferred phosphor composition for the red-emitting phosphor is represented by the formula $Sr_{1-u}Ga_2S_4 : Pb_u$ where $u$ has the approximate range 0.01 to 0.12 gram-atom per mole.

The methods of preparation of the cerium activated and lead activated strontium thiogallate phosphors utilized in the present invention are disclosed in the above-referenced copending application.

Figure 4:
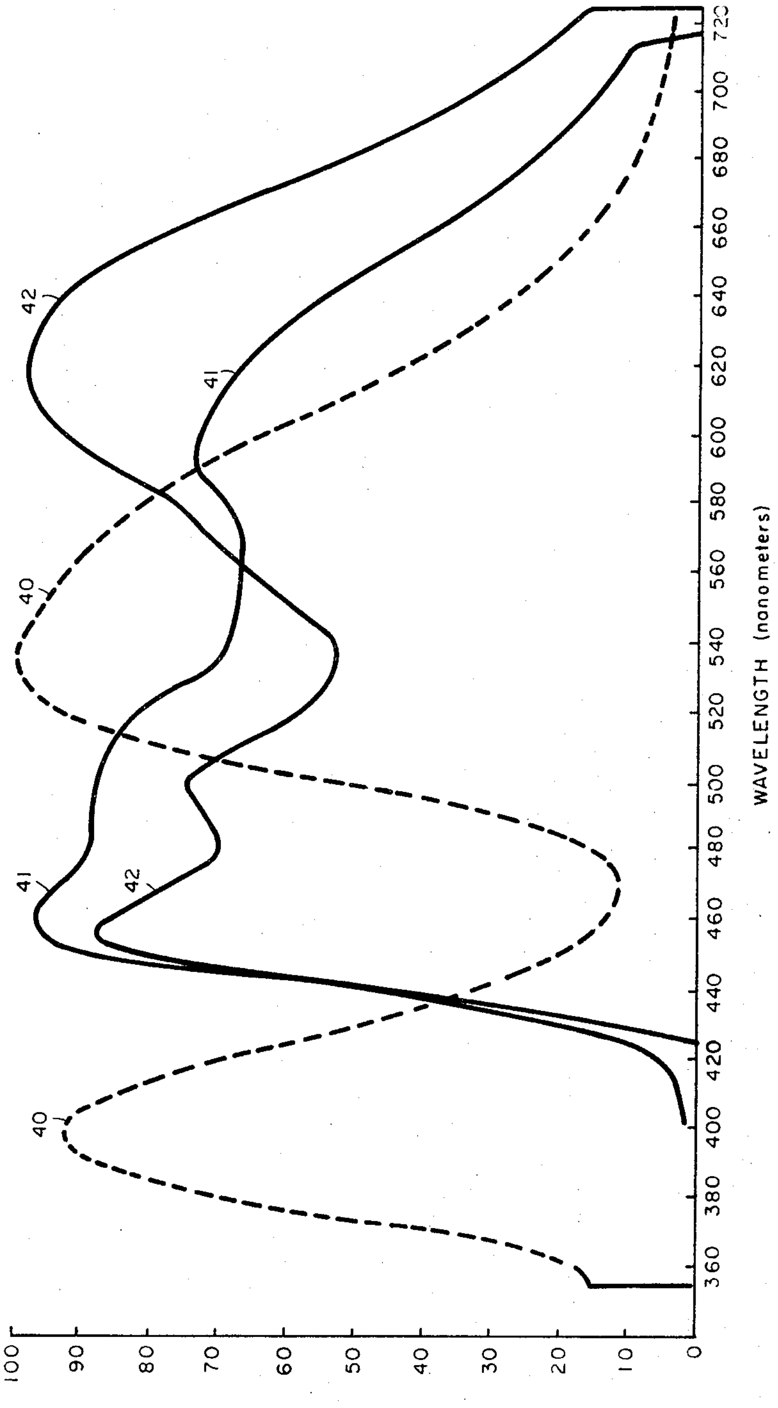
FIG. 4 shows the spectral emission characteristics of other flying spot scanner tubes embodying the invention.

Two flying-spot scanner tube phosphor screens 14 were made by settling (1) a sodium compensated strontium thiogallate activated by 0.5 mole percent cerium and 8.0 mole percent lead, and (2) a mixture of about 37 percent by weight of a strontium thiogallate activated with 8.0 mole percent lead and about 63 percent by weight of a sodium compensated strontium thiogallate activated by 12 mole percent cerium, onto tube faceplate 13. The 5 inch diameter flying-spot scanner tubes having these screens were compared with a commercially available 5 inch diameter tube having a screen consisting of a mixture of about 75 percent YAG and 25 percent CAS (by weight). FIG. 4 shows the spectral emission characteristics of the three tubes with dashed curve 40 corresponding to the CAS-YAG containing tube, curve 41 corresponding to a tube comprising a mixture of cerium and lead activated strontium thiogallate phosphors and curve 42 corresponding to a tube including the white-emitting phosphor, cerium and lead activated strontium thiogallate. It is seen that the CAS-YAG containing tube emission has a distinct minimum at about 470 nanometers, the blue-component emission of this tube peaking at about 400 nanometers and extending well into the ultraviolet region of the spectrum. The yellow component of the CAS-YAG containing tube peaks at 535 nanometers and relatively little (≈15%) of its emission extends into the red spectral region beyond 600 nanometers.

The thiogallate-containing tubes emissions have two distinct minima near 480 and 540 nanometers but the relative brightness at these minima is considerably higher than that of the CAS-YAG containing tube, thereby providing a more uniform emission over the entire spectrum. Also, it is seen that the blue-component emission of these tubes peak at about 450 nanometers and do not extend appreciably into the ultraviolet. Further, the red-component of the thiogallate-containing tubes peak near 600–620 nanometers and they therefore have more emission in the red spectral region (> 600 nanometers) than the CAS-YAG containing tube.

TABLE

| Screen Composition* | Relative Brightness Blue | Green | Red | Screen Noise % |
|---|---|---|---|---|
| 25% wt CAS, 75% wt YAG | 100 | 100 | 100 | 8 |
| 35% wt STG:Ce,Na, 63% wt STG:Pb | 140 | 108 | 116 | 8 |
| 100% wt STG:Ce, Pb, Na | 160 | 96 | 132 | 4 |

* STG:Ce,Na – $Sr_{0.76}Na_{0.12}Ga_2S_4:Ce_{0.12}$
STG:Pb – $Sr_{0.92}Ga_2S_4:Pb_{0.08}$
STG:Ce,Pb,Na – $Sr_{0.91}Na_{0.005}Ga_2S_4:Ce_{0.005}Pb_{0.08}$
CAS – $Ca_2Al_2SiO_7:Ce$
YAG – $Y_3Al_5O_{12}:Ce$

The table shows the response of each of the flying spot scanner systems three photodetectors (blue, green and red) to the radiation emitted by the strontium thiogallate (STG) tubes of the preceding example relative to the photodetector response produced by the radiation from a tube having a screen formed of the CAS-YAG mixture of that example. On this relative scale the photodetector response produced by radiation from the CAS-YAG tube was assigned a value of 100. The relative photodetector response (relative brightness) and the response of the blue, green and red detectors (blue, green and red field brightness) show that the aforementioned improvement in the spectral distribution (FIG. 4) of the disclosed thiogallate containing tubes result in a much higher blue and red field brightness relative to that of the prior art CAS-YAG containing tube. Further, it can also be seen that the previously discussed minima in the emission spectrum of the thiogallate tubes (FIG. 4) do not have any appreciable effect on the green field brightness relative to the CAS-YAG tube.

With regard to screen noise, the table shows that the noise produced in tubes containing cerium and lead-activated strontium thiogallate is one half that exhibited by the CAS-YAG containing tubes. This tube is also superior, with respect to screen noise, to those containing a mixture of cerium and lead-activated strontium thiogallate.

What is claimed is:

1. A flying-spot scanner tube for generating a moving spot of white light comprising:

a. an evacuated envelope having a faceplate at one end;

b. a phosphor screen positioned relative to the internal surface of said faceplate comprising an electron-responsive phosphor consisting substantially of strontium thiogallate coactivated by about 0.5 mole percent trivalent cerium and 8.0 mole percent divalent lead;

c. an electron gun mounted within said evacuated envelope, said gun forming an electron beam which impinges upon said phosphor screen, and d. means for deflecting said electron beam so that it scans said phosphor screen in a predetermined pattern.

* * * * *

UNITED STATES PATENT OFFICE
CERTIFICATE OF CORRECTION

Patent No. 3,742,277 Dated June 26, 1973

Inventor(s) THOMAS E. PETERS

It is certified that error appears in the above-identified patent and that said Letters Patent are hereby corrected as shown below:

In the title, on the cover page and in column 1, line 2, change "thiogallte" to --thiogallate--.

Column 2, line 47, delete "of" (second occurrence).

Signed and sealed this 6th day of August 1974.

(SEAL)
Attest:

McCOY M. GIBSON, JR.
Attesting Officer

C. MARSHALL DANN
Commissioner of Patents